J. F. BEATTY.
BAIT HOLDER.
APPLICATION FILED DEC. 26, 1908.

933,818.

Patented Sept. 14, 1909.

Witnesses
M. C. Lyddane
J. O. L. Mulhall

Inventor
John F. Beatty

By Joshua R. H. Potts

Attorney

UNITED STATES PATENT OFFICE.

JOHN F. BEATTY, OF MORTON, PENNSYLVANIA.

BAIT-HOLDER.

933,818.  Specification of Letters Patent.  Patented Sept. 14, 1909.

Application filed December 26, 1908. Serial No. 469,404.

*To all whom it may concern:*

Be it known that I, JOHN F. BEATTY, a citizen of the United States, residing at Morton, in the county of Delaware and State of Pennsylvania, have invented certain new and useful Improvements in Bait-Holders, of which the following is a specification.

My invention relates to an improved bait holder, and more particularly to improvements of this kind devised especially for fishing, in which the bait is held out of reach of the fish and from which a hook protrudes so as to catch the fish while it is nibbling at the bait.

With this object in view, the invention consists in certain novel features of construction, and combinations, and arrangements of parts as will be more fully hereinafter described and pointed out in the claims.

Figure 1:
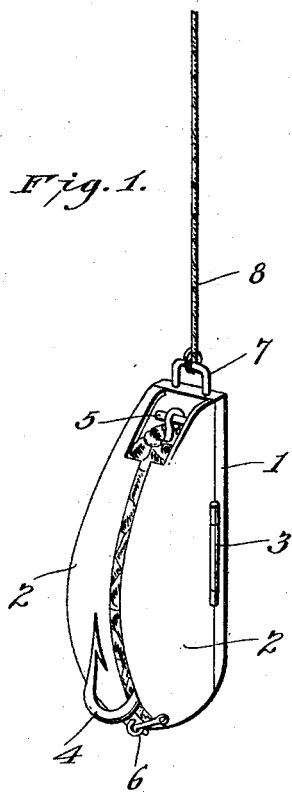
Figure 2:
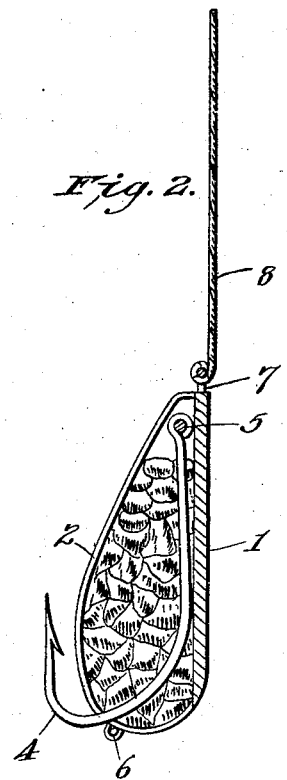
Figure 3:
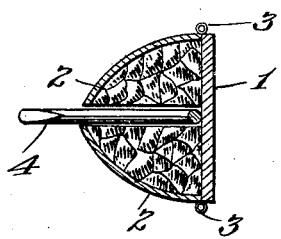

In the accompanying drawings, Figure 1, is a perspective view illustrating my improvements. Fig. 2, is a view in vertical section, and Fig. 3, is a view in cross section.

My improved bait holder comprises a casing made in three parts.

1 represents the back of the casing, and 2, 2, are rounded sides connected to the edges of the back by hinges 3, and adapted when in closed position to provide a longitudinal opening, through which the bait within the casing can be seen by the fish, and affording a mounting for the hook 4. The hook 4 is pivotally secured at its upper end on a cross pin 5, and its lower hooked end projects out beyond the casing so that the fish while nibbling at the bait, which they cannot reach, will be caught on the hook.

To hold the side portions 2, 2, in closed position, I may provide any suitable fastener, a hook and eye being illustrated. A staple 7 is secured in the upper end of the back portion 1, and is adapted for the attachment of the fishing line 8.

The advantages of a construction of this kind are many. It is simply necessary to fill the casing with the desired bait, and as the fish cannot remove it, there is no need of continually drawing up the line to see if the bait has gone, and but a small quantity of bait will serve for an indefinite length of time.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. A device of the character described, comprising a casing having a back, and sides hinged to said back, and a hook pivoted in said casing and projecting out between the sides.

2. A device of the character described, comprising a bait receiving casing having a longitudinal opening in its front, a hook mounted in the casing, a pin pivotally supporting the upper end of the hook, and the lower end of the hook projecting out through the opening in said casing.

In testimony whereof I have signed my name to this specification in the presence of two subscribing witnesses.

JOHN F. BEATTY.

Witnesses:
R. H. KRENKEL,
J. A. L. MULHALL.